United States Patent Office 3,501,525
Patented Mar. 17, 1970

3,501,525
PROSTAGLANDIN UREIDES
Milton Lapidus, Rosemont, Norman H. Grant, Wynnewood, Marvin E. Rosenthale, Havertown, and Harvey E. Alburn, West Chester, Pa., assignors to American Home Products Corporation, New York, N.Y., a corporation of Delaware
No Drawing. Filed Oct. 4, 1967, Ser. No. 672,728
Int. Cl. C07c *127/00*
U.S. Cl. 260—553
2 Claims

ABSTRACT OF THE DISCLOSURE

Novel prostaglandin ureides (I) are prepared by treating prostaglandins with appropriately-substitued carbodiimides. Said prostaglandin ureides have valuable pharmacological properties, especially as bronchodilators.

This invention relates to novel derivatives of prostaglandins. More particularly, it is concerned with ureido derivatives of prostaglandins, which have valuable pharmacological properties, especially as bronchodilators.

Background of the invention

A number of drugs in a variety of combinations and dosage forms are currently available as bronchodilators, i.e.: substances able to relax the smooth muscle of the bronchial tree and thus control spasm and facilitate breathing in conditions such as bronchial asthma, bronchitis, bronchiectasis, pneumonia and emphysema. All of the bronchodilator preparations incorporate one or more of three basic types of compounds: (a) sympathomimetic (adrenergic), agents, (b) xanthine derivatives and (c) corticosteroids. These drugs can be used in combination with antitussives, expectorants, mucolytics, and the like.

The sympathomimetic agents most often used are epinephrine, isoproterenol, phenylephine and ephedrine. These adrenergic agents are the most powerful and most useful drugs in the relief of severe asthmatic spasm (status asthmaticus), however, as with other dilators they have various side effects. Some of the more important untoward effects are stimulation of the cardiovascular and central nervous system, hyperglycemia and tolerance (tachyphylaxis), which greatly reduces effectiveness. The discovery of the bronchodilator activity of isoproterenol stimulated synthesis of new sympathomimetic agents with more selective bronchodilator activity. The structural requirements for action on the beta-receptors of both the bronchial musculature and the cardiovascular system appear similar and dissociation of these two effects has, thus far, not been demonstrated.

The two xanthine derivatives most widely used are theophylline and aminophylline. Some of the problems associated with therapy here include variable oral absorption, cardiovascular effects and inability to achieve adequate dosage levels without gastric irritation. The xanthines are not as active as the sympathomimetics in acute situations and can be quite dangerous when administered intravenously.

Many cases of asthma and status asthmaticus refractory to usual treatment methods are now controlled by the corticosteroids. The mechanism by which the steroids are effective is not known; however, it is thought that their marked effectiveness in preventing capillary permeability changes may reduce swelling in the bronchial tract and thus serve to restore normalcy. The anti-immune activity of the corticosteroids may also be extremely important in asthma which is an allergic disease. Long term treatment of asthma with steroids involves the risk of sodium retention, hypertension, ulcers, calcium loss from osseous structures and other well known side effects.

All of these drugs are available in a variety of dosage forms, the oral route being used primarily for maintenance therapy while injectables tend to be used in acute emergency situations. Inhalation (aerosols and solution for nebulizers) are faster acting than oral but slower than injectables and are now being used together with sympathomimetic and corticosteroids either for maintenance or moderately acute-stage therapy. Isoproterenol is the leading inhalant used at the present time.

Thus, the agents available to now have a number of problems associated with their use, including toxicity, low activity (especially in the xanthines), adverse effect on the cardiovascular system (especially in the sympathomimetics) and fluid retention or edema (with the corticosteroids). An addition to the collection of agents to treat bronchial spasm would clearly be welcome. It is clear, therefore, that a definite need exists for means employing an effective and well-tolerated bronchodilating agent.

It is, accordingly, a primary object of this invention to provide compounds which relieve bronchial spasm and facilitate breathing.

It is another object of this invention to provide new bronchial smooth muscle dilators which are nonsteroidal, noncatecholamine, and nonxanthine.

It is still a further object of this invention to provide compounds to relieve bronchial spasm, characterized by rapid onset on action, long action and a good degree of tolerance.

Still another object of this invention is to provide compounds to relieve bronchial spasm, which can be administered in therapy by the oral inhalation route.

Description of the invention

These and other objects readily apparent to those in the are are easily obtained by use of the compounds of the instant invention which are, in essence: a prostaglandin ureide compound of Formula I:

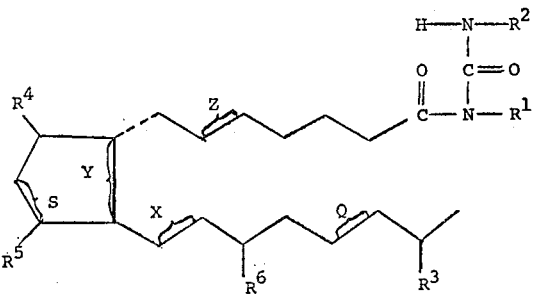

wherein:

$R^1$ and $R^2$ are (lower)alkyl, phenyl, hydroxyphenyl, carbamylphenyl, aminophenyl, mono(lower)alkylaminophenyl or di(lower) alkylaminophenyl;
$R^3$ is hydrogen or alpha-hydroxyl;
$R^4$ and $R^6$ are keto or alpha-hydroxyl;
S and Y are single or double bonds;
$R^5$ is alpha hydroxyl or H when S is a single bond, or $R^5$ is H when S is a double bond;
X is a single bond or a trans-double bond; and
Q and Z are single bonds or cis-double bonds.

Special mention is made on one particularly valuable embodiment of this invention. This is the highly active compound: 1,3 - bis(p-dimethylaminophenyl)-1-(7-3-hydroxy-2-(3 - hydroxy - 1 - octentyl)-5-oxocyclopentyl-5-heptenoyl)urea, compound of Formula I wherein $R^1$ and $R^2$ and p-dimethylaminophenyl; $R^3$ is hydrogen; $R^4$ is keto; $R^5$ is alpha-hydroxyl; $R^6$ is alpha-hydroxyl; S, Y, and Q are single bonds; X is a trans-double bond and Z is a cis-double bond.

When used herein and in the appended claims, the term "(lower)alkyl" contemplates alkyl radicals, straight and branched chain, or from about 1 to about 6 carbon atoms. Illustrative (lower)alkyl groups therefore include methyl, ethyl, n-propyl, i-propyl, n-butyl, t-butyl, n-pentyl, 2-methylpentyl, n-hexyl, and the like.

The compounds of Formula I herein are prepared by reacting a prostaglandin of Formula II:

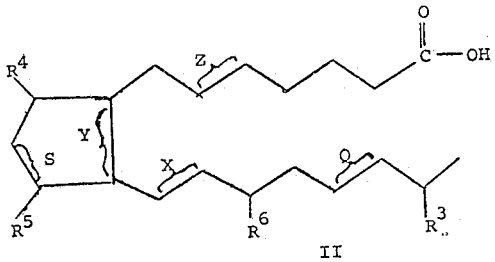

wherein $R^3$, $R^4$, $R^5$ and $R^6$, S, Q, X, Y, and Z are as hereinabove defined with a substituted carbodiimide of Formula III:

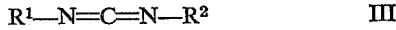

$$R^1-N=C=N-R^2 \quad \text{III}$$

wherein $R^1$ and $R^2$ are as defined above, until formation of a prostaglandin ureide of Formula I is substantially complete, and recovering said prostaglandin ureide.

Starting materials of Formula II, the prostaglandins, are prepared in known ways either by isolation from natural sources, for example, the vesicular glands of sheep; or by enzymatic conversion (biosynthesis) from fatty acid substrates, such as arachidonic acid, and, depending on the substituents desired, chemically transforming double bonds to single bonds, by hydrogenation, converting keto groups to hydroxymethylene groups by reduction, dehydrating to introduce double bonds, and the like. Specific methods for providing all of the prostaglandins of Formula II are found in S. Bergstrom, Science, 157, 382 (1967); C. B. Struijk, R. K. Beerthius, H. J. J. Pabon, and D. C. Van Dorp, Recuiel, 85, 1233 (1960); M. Hamberg and B. Samuelsson, Biochim, Biophys Acta, 106, 215–217 (1965); B. Samuelsson, Angew, Chem. Inter. Edit., 4, 410 (1965); E. W. Horton, Experientia, 21, 113–176 (1965); and references cited therein, as well as the copending patent application of M. Lapidus, N. H. Grant, and H. E. Alburn, U.S. Ser. No. 617,061, filed Feb. 20, 1967.

The carbodiimides of Formula III are commercially available in some instances or are easily prepared by techniques known to those skilled in the art. In general they are prepared by reacting carbon disulfide and an appropriately-substituted amine, then removing the by-product sulfur with mercuric oxide. Methods for preparing compounds of Formula III are reviewed in detail by H. G. Khorana in Chem. Rev., 53, 145–166 (1953).

In one manner of preparing the compounds of Formula I, a solution of the prostaglandin of Formula II in an appropriate solvent, such as the ethyl ether or the like, is mixed with a solution of the carbodiimide of Formula III also in an appropriate solvent, such as diethyl ether or the like. Condensation will occur at temperatures of between about 0° C. and about 150° C., but it is preferred to heat the mixture to reflux until condensation is substantially complete. In a typical case, the condensation of prostaglandin $E_2$ with a bis(p-dimethylaminophenyl) carbodiimide, condensation is complete after 2 hours of refluxing. The product can be recovered in any convenient manner. For example, the reaction mixture can be concentrated to about ¼ the volume, then cooling will cause the precipitation of the product and it can be recovered by filtration. The product can be purified, if desired, by recrystallization from an appropriate solvent, such as a lower alkanol, i.e., methanol or a mixture of a lower alkanol and water.

Administration of compounds of Formula I of this invention to animals suffering from bronchial spasm provides relief in asthma, emphysema, bronchitis and like conditions wherever highly potent bronchodilating agents are used.

Compounds of Formula I can be administered in a variety of dosage forms, the oral route being used primarily for maintenance therapy while injectables tend to be useful in acute emergency situations. Inhalation (aerosols and solution for nebulizers) seems to be somewhat faster acting than other oral forms but slower than injectables and this method combines the advantages of maintenance and moderately-acute stage therapy in one dosage unit.

The daily dose requirements vary with the particular composition being employed and the severity of the symptoms being presented. The dosage varies with the size of the patient. With large animals, by the oral inhalation route, with, for example, a hand nebulizer or a pressurized aerosol dispenser, the ordinary effective dose from about 50 milligrams to about 150 milligrams of the instant compounds every four hours, as needed. By the oral ingestion route, preferably sublingually, the effective dose is from about 250 to about 1000 mg., preferably from about 500 to about 750 mg., up to a total of about 3000 mg. per day. By the intravenous route, the ordinary effective dose is from about 50 milligrams to about 250 milligrams, preferably about 175 milligrams per day.

For dosage units, the compounds of Formula I can be compounded into any of the usual oral dosage forms including tablets, capsules and liquid preparations such as elixirs and suspensions containing various coloring, flavoring, stabilizing and flavor masking substances. For compounding oral dosage forms the active ingredient can be diluted with various tableting materials such as starches of various types, calcium carbonate, lactose, sucrose and dicalcium phosphate to simplify the tableting and capsulating process. A minor proportion of magnesium stearate is useful as a lubricant.

For administration by the oral inhalation route with conventional nebulizers or by oxygen aerosolization it is convenient to provide the compound of Formula I in dilute aqueous solution or suspension preferably at concentrations of about 1 part of medicament to from about 100 to 200 parts by weight of total preparation. Entirely conventional additives may be employed to stabilize these preparations or to provide isotonic media, for example, sodium chloride, sodium citrate, citric acid, sodium bisulfite, and the like may be used.

For administration as a self-propelled dosage unit for administering the medicament in aerosol form suitable for inhalation therapy, the compounds can be used in compositions comprising the medicament suspended in an inert propellant (such as a mixture of dichlorodifluoromethane and dichlorotetrafluoro ethane) together with a co-solvent, such as ethanol, flavoring materials and stabilizers. Instead of a co-solvent there can also be used a dispensing agent such as oleyl alcohol. Suitable means to employ the aerosol inhalation therapy technique are described fully in U.S. 2,868,691 and 3,095,355.

Description of the preferred embodiments

The following examples are given simply to illustrate this invention, but not in any way to limit its scope.

EXAMPLE 1

1,3 - bis(p - dimethylaminophenyl) - 1-[[7-[3-hydroxy-2-(3-hydroxy-1-octenyl)-5-oxocyclopentyl]-5-heptenoyl]] urea A solution of 0.681 g., 0.002 mole of 7-[3-hydroxy-2-(3-hydroxy-1-octenyl)-5-oxocyclopentyl]-5-heptenoic acid ($PGE_2$, prepared according to Example 1 of U.S. patent application, Ser. No. 617,061, filed Feb. 20, 1967) in 15 ml. of ether is added to 0.588 g., of bis-(p-dimethylaminophenyl) carbodiimide dissolved in 25 ml. of ether. The mixture is refluxed for two hours and then the volume is reduced to 25 ml. by evaporation. After standing overnight at 25° C. and for 10 days at −11° C., the precipitated product is collected by vacuum filtration and dried in a vacuum desiccator at 8° C. The yield is 0.620 g., M.P. 48–52° C.

Analysis.—Calcd. for $C_{37}H_{52}O_5N_4$ (percent): C, 70.22; H, 8.28; N, 8.85. Found (percent): C, 69.97; H, 8.36; N, 8.38.

EXAMPLE 2

The procedure of Example 1 is repeated substituting for the $PGE_2$, stoichiometrically-equivalent amounts of the corresponding suitably-substituted prostaglandins and for the bis(p-dimethylaminophenyl)-carbodiimide, stoichiometrically-equivalent amounts of the corresponding suitably-substituted carbodiimides. The following prostaglandin ureides are obtained:

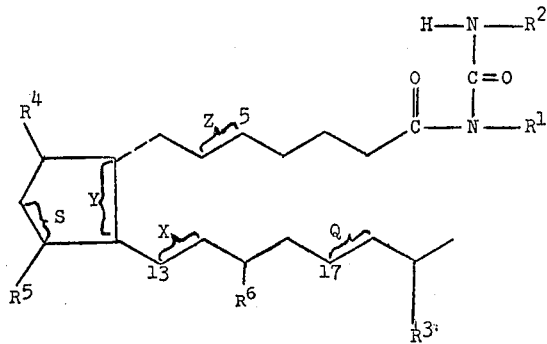

We claim:
1. A compound of the formula

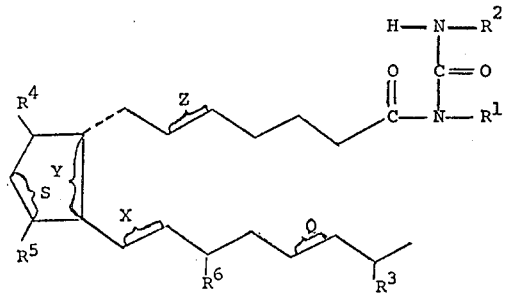

wherein:

$R^1$ and $R^2$ are (lower)alkyl, phenyl, hydroxyphenyl, carbamylphenyl, aminophenyl, mono(lower)alkylaminophenyl or di(lower)alkylaminophenyl;
$R^3$ is hydrogen or alpha-hydroxyl;
$R^4$ and $R^6$ are keto or alpha-hydroxyl;
S and Y are single or double bonds;
$R^5$ is alpha hydroxyl or H when S is a single bond, or $R^5$ is H when S is a double bond;
X is a single bond or a trans-double bond; and
Q and Z are single bonds or cis-double bonds.

2. A compound as defined in claim 1 wherein $R^1$ and $R^2$ are p-dimethylaminophenyl; $R^3$ is hydrogen; $R^4$ is keto; $R^5$ is alpha-hydroxyl; $R^6$ is alpha-hydroxyl; S, Y, and Q are single bonds; X is a trans-double bond and Z is a cis-double bond.

| $R^1$ | $R^2$ | $R^3$ | $R^4$ | $R^5$ | $R^6$ | Q | S | X | Y | Z |
|---|---|---|---|---|---|---|---|---|---|---|
| p-$H_2NC_6H_4$— | p-$H_2NC_6H_4$— | H | —O | —OH($\alpha$) | —OH($\alpha$) | s.b.[1] | s.b. | t.d.b.[2] | s.b. | s.b. |
| p-$H_2NC_6H_4$— | p-$H_2NC_6H_4$— | H | —O | —OH($\alpha$) | —OH($\alpha$) | c.d.b. | s.b. | t.d.b. | s.b. | c.d.b. |
| p-$H_2NC_6H_4$— | p-$H_2NC_6H_4$— | H | —OH($\alpha$) | —OH($\alpha$) | —OH($\alpha$) | s.b. | s.b. | t.d.b. | s.b. | s.b. |
| p-$H_2NC_6H_4$— | p-$H_2NC_6H_4$— | H | —OH($\alpha$) | —OH($\alpha$) | —OH($\alpha$) | c.d.b. | s.b. | t.d.b. | s.b. | c.d.b. |
| p-$H_2NC_6H_4$— | p-$H_2NC_6H_4$— | H | —OH($\alpha$) | —OH($\alpha$) | —OH($\alpha$) | c.d.b. | s.b. | t.d.b. | s.b. | c.d.b. |
| p-$H_2NC_6H_4$— | p-$H_2NC_6H_4$— | H | —O | —H | —OH($\alpha$) | s.b. | s.b. | t.d.b. | d.b. | s.b. |
| p-$H_2NC_6H_4$— | p-$H_2NC_6H_4$— | H | —O | —H | —OH($\alpha$) | s.b. | s.b. | t.d.b. | d.b. | c.d.b. |
| p-$H_2NC_6H_4$— | p-$H_2NC_6H_4$— | H | —O | —H | —OH($\alpha$) | c.d.b. | s.b. | t.d.b. | d.b. | c.d.b. |
| p-$H_2NC_6H_4$— | p-$H_2NC_6H_4$— | H | —O | -------- | —OH($\alpha$) | s.b. | d.b. | t.d.b. | s.b. | s.b. |
| p-$H_2NC_6H_4$— | p-$H_2NC_6H_4$— | H | —O | -------- | —OH($\alpha$) | s.b. | d.b. | t.d.b. | s.b. | c.d.b. |
| p-$H_2NC_6H_4$— | p-$H_2NC_6H_4$— | H | —O | -------- | —OH($\alpha$) | c.d.b. | s.b. | t.d.b. | s.b. | c.d.b. |
| p-$H_2NC_6H_4$— | p-$H_2NC_6H_4$— | —OH($\alpha$) | —O | H | —OH($\alpha$) | s.b. | s.b. | t.d.b. | d.b. | s.b. |
| p-$H_2NC_6H_4$— | p-$H_2NC_6H_4$— | —OH($\alpha$) | —O | H | —OH($\alpha$) | s.b. | s.b. | t.d.b. | d.b. | c.d.b. |
| p-$H_2NC_6H_4$— | p-$H_2NC_6H_4$— | —OH($\alpha$) | —O | -------- | —OH($\alpha$) | s.b. | d.b. | t.d.b. | s.b. | s.b. |
| p-$H_2NC_6H_4$— | p-$H_2NC_6H_4$— | —OH($\alpha$) | —O | -------- | —OH($\alpha$) | s.b. | d.b. | t.d.b. | s.b. | c.d.b. |
| p-$H_2NC_6H_4$— | p-$H_2NC_6H_4$— | H | —O | H | —OH($\alpha$) | s.b. | s.b. | s.b. | s.b. | s.b. |
| p-$H_2NC_6H_4$— | p-$H_2NC_6H_4$— | H | —OH($\beta$) | —OH($\alpha$) | —OH($\alpha$) | s.b. | s.b. | s.b. | s.b. | s.b. |
| p-$H_2NC_6H_4$— | p-$H_2NC_6H_4$— | H | —OH($\alpha$) | —OH($\alpha$) | —OH($\alpha$) | s.b. | s.b. | s.b. | s.b. | s.b. |
| $CH_3$ | $CH_3$ | H | —O | —OH($\alpha$) | —OH($\alpha$) | s.b. | s.b. | t.d.b. | s.b. | c.d.b. |
| $CH_3(CH_2)_4CH_2$— | $CH_3(CH_2)_4CH_2$— | H | —O | —OH($\alpha$) | —OH($\alpha$) | s.b. | s.b. | t.d.b. | s.b. | c.d.b. |
| ⌬— | ⌬— | H | —O | —OH($\alpha$) | —OH($\alpha$) | s.b. | s.b. | t.d.b. | s.b. | c.d.b. |
| HO—⌬— | HO—⌬— | H | —O | —OH($\alpha$) | —OH($\alpha$) | s.b. | s.b. | t.d.b. | s.b. | c.d.b. |
| $CH_3$(H)N—⌬— | $CH_3$(H)N—⌬— | H | —O | —OH($\alpha$) | —OH($\alpha$) | s.b. | s.b. | t.d.b. | s.b. | c.d.b. |
| $(CH_3)_2$N—⌬— | $(CH_3)_2$N—⌬— | H | —O | —OH($\alpha$) | —OH($\alpha$) | s.b. | s.b. | t.d.b. | s.b. | c.d.b. |
| $H_2$NCO—⌬— | $H_2$NCO—⌬— | H | —O | —OH($\alpha$) | —OH($\alpha$) | s.b. | s.b. | t.d.b. | s.b. | c.d.b. |
| p-$H_2NC_6H_4$— | p-$H_2NC_6H_4$— | H | —O | —OH($\alpha$) | —O | s.b. | s.b. | t.d.b. | s.b. | c.d.b. |

[1] s.b., single bond, —$CH_2C_2H$—.   [2] d.b., double bond, —CH=CH—; [2] d.b., trans-double bond; c.d.b., cis-double bond.

References Cited

UNITED STATES PATENTS 3,432,541   3/1969   Bagli et al. _____ 260—514

LEON ZITVER, Primary Examiner

M. W. GLYNN, Assistant Examiner

U.S. Cl. X.R.

260—999; 424—322

UNITED STATES PATENT OFFICE
CERTIFICATE OF CORRECTION

Patent No. 3,501,525          Dated March 17, 1970

Inventor(s) Milton Lapidus et al.

It is certified that error appears in the above-identified patent and that said Letters Patent are hereby corrected as shown below:

Column 1, line 37, should read: "... epinephrine, isoproterenol, phenylephrine and ephedrine."
Column 2, line 35, after "those" insert -- skilled --; line 36, should read: "... art are easily obtained by use of the compounds of the ..." Column 5, ultimate line, should read: $^1$s.b., single bond, $-CH_2CH_2-$. $^2$d.b., double bond, $-CH=CH-$; t.d.b., trans-double bond; c.d.b., cis-double bond."

Signed and sealed this 18th day of August 1970.

(SEAL)
Attest:

EDWARD M. FLETCHER, JR.          WILLIAM E. SCHUYLER, JR.
Attesting Officer                  Commissioner of Patents